US006887413B1

(12) United States Patent  Schumacher

(10) Patent No.: US 6,887,413 B1
(45) Date of Patent: May 3, 2005

(54) PROCESS FOR MANUFACTURING A COVERING OR TRIM PART WITH A DIRECTLY MOLDED ON CARRIER

(75) Inventor: Rolf Schumacher, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/296,276

(22) Filed: Apr. 22, 1999

(30) Foreign Application Priority Data

Apr. 23, 1998 (DE) .......................................... 198 18 119

(51) Int. Cl.[7] .............................................. B29C 45/14
(52) U.S. Cl. ....................... 264/135; 264/163; 264/266; 425/127; 425/129.1
(58) Field of Search ................................ 264/135, 163, 264/266; 475/127, 129.1

(56) References Cited

U.S. PATENT DOCUMENTS

| 4,369,157 | A | * | 1/1983 | Conner ........................ 264/246 |
| 5,223,201 | A | * | 6/1993 | Masui et al. ................. 264/163 |
| 5,225,264 | A | * | 7/1993 | Kato et al. ................... 428/137 |
| 5,525,179 | A | * | 6/1996 | Stickling ..................... 156/245 |
| 5,629,029 | A | * | 5/1997 | Souder et al. ............... 425/112 |
| 5,830,402 | A | * | 11/1998 | Harada et al. .............. 264/266 |
| 5,902,533 | A | * | 5/1999 | Munger et al. ............. 264/254 |

| 6,207,090 | B1 | * | 3/2001 | Knisely et al. ............. 264/138 |

FOREIGN PATENT DOCUMENTS

| DE | 24 44 267 A1 | | 4/1975 |
| DE | 29 44 797 | | 1/1982 |
| DE | 195 46 551 C1 | | 1/1997 |
| JP | 56005747 | * | 1/1981 |
| JP | 57-116623 A | * | 7/1982 |
| JP | 60-220719 | | 11/1985 |
| JP | 62201215 | * | 9/1987 |
| JP | 63216717 | * | 9/1988 |
| JP | 05269793 | * | 10/1993 |
| JP | 09234769 | * | 9/1997 |

OTHER PUBLICATIONS

Definition of "stamp"; Webster's II: New Riverside University Dictionary, 1984, pp. 1130–1131.*

* cited by examiner

Primary Examiner—Edmund H. Lee
(74) Attorney, Agent, or Firm—Crowell & Moring LLP

(57) ABSTRACT

A covering or trim part includes an injection molding compound and a decor part durably connected with the molding compound. The decor part may contain a real-wood veneer as well as a metal part. The covering a trim part is made by combining an injection molding operation with a cutting operation of the decor part in the injection. A multi-part injection mold permits more complicated molding and undercutting and/or the forming of variable wall thicknesses.

9 Claims, 1 Drawing Sheet

PROCESS FOR MANUFACTURING A COVERING OR TRIM PART WITH A DIRECTLY MOLDED ON CARRIER

BACKGROUND AND SUMMARY OF THE INVENTION

This application claims the priority of German Patent Application No. 198 18 119.1, filed Apr. 23, 1998, the disclosure of which is expressly incorporated by reference herein.

The present invention relates to a process for manufacturing a covering, paneling, or trim part with a directly molded-on carrier. Furthermore, the present invention relates to a covering or trim part manufactured according to this process as well as to a casting mold therefor.

From German Patent Document DE-Al-24 44 267, a process is if known for manufacturing an object made of plastic on which at least one surface is covered with metal in an injection mold. According to this process, objects are manufactured which have fairly large surfaces whose appearance has to meet high demands, for example, refrigerators, bath tubs and certain automobile parts, particularly those used as an interior covering in passenger cars. In addition to a flawless surface, a corresponding high stiffness and resistance to warping are also demanded.

In the known process, an at least two-part injection mold is used. A metal sheet, which forms the decor part of the covering and trim part is placed in the injection mold and is premolded when the mold is closed. After the complete closing, the edge is clamped in between the two parts of the injection mold. This simultaneously results in a sealing of the mold toward the outside. When the injection molding compound is subsequently injected, it causes a further molding of the decor casting in the manner of a deep drawing operation. Simultaneously, connection with the injection molding material takes place. As soon as the injection molding material has hardened, the mold is opened and the covering and trim part is removed. It must then still be treated on its edge which is clamped during the injection molding. This aftertreatment requires high expenditures and is therefore expensive.

From German Patent Document DE 195 46 551 C1, a coated decor part is known. In this case, flat unformed sheet bars are placed in the injection mold and are formed by the pressure of the injected plastic material corresponding to the interior shape of the mold cavity so that they assume its shape. This document relates to the manufacturing of a covering and trim part in a so-called sandwich construction, i.e., with an upper and a lower covering as well as a plastic filling situated in-between.

Furthermore, a manufacturing process is known in which fiber-reinforced plastic materials are pressed behind the decors. These are pressing processes in which duroplastic (SMC) and thermoplastic (GMT) materials are used.

It is a disadvantage of the known pressing process that the material is deformed by a pressing operation, which means that the inserted decor part is placed in the mold in a "floating" manner. Furthermore, undercut contours are possible only to a very limited extent because the required mold parts must be moved together with the pressing movement in flowing material. Also, multiple molds cannot be used in most of these cases.

It is therefore an object of the present invention to a manufacture a covering and trim part that can be produced having an excellent surface and a high precision without any treatment after the molding injection. Furthermore, it is an object to produce a covering and trim part which is manufactured according to this process as well as a casting mold by means of which this process can be carried out.

In contrast to the known processes requiring the covering and trim part to be cut to its final size after removal from the injection mold, the cutting to size of the decor part takes place in the injection mold according to the present invention. This is an important advantage not only with respect to saving time, but also with respect to reducing cost. Reducing costs is important because, as a rule, such covering and trim parts are mass-produced articles. The molding injection is advantageously carried out at a temperature of approximately 150° C.

As a further development of the process for manufacturing the decor part, a layer of blind veneer is placed on a layer of fine-wood veneer and a layer of a nonwoven coating saturated with phenol melamine resin or only a layer of glue is arranged in-between. The layer of blind veneer is optional. The nonwoven coating stabilizes and seals the wood veneer so that, during the subsequent injection molding process, no injection molding compound can flow out onto the veneer front side. The adherence of the injection molding compound is achieved by a corresponding surface treatment of the last layer (nonwoven coating, bonding agent) or by the general surface roughness.

If no fine-wood appearance of the covering and trim part is demanded, but instead the visible surface is to be formed by metal or by metal provided with a coating, another embodiment of the present invention provides that a coupling layer, particularly a reactive hot-melt-type adhesive or a "dry" glue film, is applied to the backside of a sheet metal part, for producing the decor part. This layer is heated and/or activated by the injection molding compound. The basic principle of the process, specifically the cutting to size of the decor part during the closing of the injection mold and therefore inside the injection mold does not change.

The process according to the present invention for manufacturing decor parts with a decorative surface can be carried out by using, in addition to the above-mentioned materials, specifically real-wood veneer; metal, such as aluminum, steel or copper; and paper, textile or other fiber materials or fabrics.

In the process according to the present invention, the decor blank can be securely positioned in the injection mold. By means of a flow of plastic material against, particularly a central region of the decor component, sealing is automatically achieved between the decor back side and the carrier part. In addition, if the mold is equipped with a dipping edge extending around the outer contour of the part, a precise cut with respect to the contour of the decor part can be achieved during the closing of the mold. As a result, an excellent fit of the decor blank with respect to the mold contour and thus a good sealing is achieved.

It is also important that, by means of the injection molding process according to the present invention, complicated and undercut contours, as needed in the case of function elements, such as fastening hooks, locking devices for switches, and the like can be produced.

The process is also highly reproducible because the material for the molded-on carriers can be introduced in the mold in a reproducible manner. This is in contrast to placing a carrier into the mold during pressing of the decor blank, which necessarily results in tolerances in the case of the insertion weight and of the position of the inserted blanks.

The blank temperature required for the hardening of the reactive mass is preferably approximately 150° C. and is simultaneously used for the hardening, for example, of a duroplastic glue film. This permits a high degree of deforming of wood because, during the filling operation, a displacement of the veneer layers can take place with respect to one another.

The manufacturing of metal decor parts can take place in the same manner. In the case of metal decor parts, the plane or preformed sheet metal part, for example, made of aluminum or other metals, is either coated on the backside with a coupling layer (such as a reactive hot-melt-type adhesive) and is placed in the mold, or is placed in the injection mold together with a "dry" glue film and the injection takes place behind it. The thermal expansions, for example, of aluminum and resin/fiberglass compound are very similar so that a low-tension construction can be achieved in the case of this combination of materials.

When injecting behind wood veneers, paper and textiles, the required deforming can be achieved by a flowing-on of the injection molding mass. At relatively low degrees of deformation, this also applies to metallic decors, such as decorative metal sheets made of aluminum or other metals.

Finally, it is also advantageous that, by the use of a dyed material, the covering and trim part edges and the backside can be produced with a finished surface.

Other objects, advantages and novel features of the present invention will become apparent from the following detailed description of the invention when considered in conjunction with the accompanying drawings.

DETAILED DESCRIPTION OF THE DRAWINGS

Figure 1:
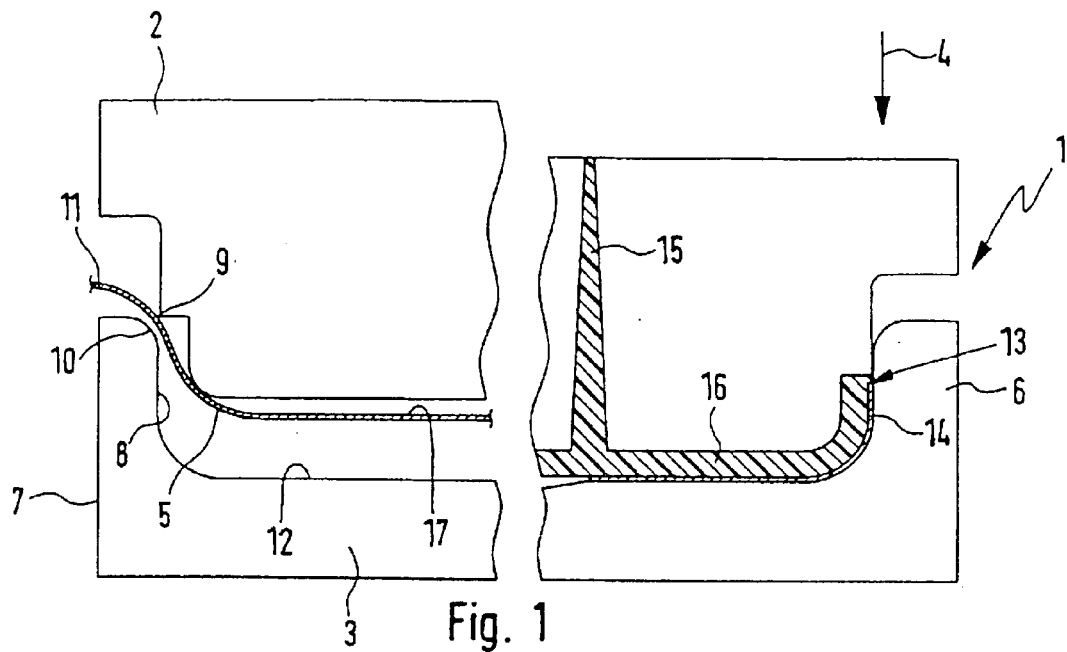
FIG. 1 is a vertical sectional view of the pressing and cutting tool according to the present invention, the left half of the figure showing the position approximately during the cutting and the right half of the figure showing the position after the injection molding.

In the embodiment of FIG. 1, the injection mold 1 consists of the injection mold top part 2 and of the injection mold bottom part 3. Both parts may in each case consist of one piece. The top part 2 can be adjusted in the direction of the arrow 4 toward the bottom part 3. A decor part 5 is placed on the edge area 6 of the bottom part 3, which decor part 5 extends, for example, to the outer contour 7 of the bottom part or even slightly projects beyond it. It should in every case project sufficiently far over the vertical inner contour 8 to the outside. According to FIG. 1, it may even be slightly shaped toward the front, that is, have a slight cup or pot shape.

A surrounding cutting edge 9 is formed on one of the two injection mold parts. In the embodiment, the cutting edge is formed on the top part 2 and interacts with an opposing cutting edge of the other injection mold part (i.e., of the bottom part 3) in the sense of a cutting tool. It is provided in the embodiment that the assigned upper interior wall area 10 is provided with a conical or curved contour. The dimensioning in this area is selected such that, starting from the intermediate position of the top part 2 illustrated on the left in FIG. 1, during a further downward stroke in the direction of the arrow 4 the gutting edge 9 is moved past the interior wall area 10 at a tolerance value customary in the case of cutting tools. As a result, the shearing-off of the outer edge 11 of the decor part 5 takes place and the cutting edge 9, according to the right half of FIG. 1, pushes the decor part 9 in front of itself until it has arrived on the interior bottom surface 12 of the injection mold. Simultaneously, a sealing also takes place between the cutting edge 9 and the formed front edge 13 of the decor part 5. The downward stroke 4 is set such that the upward-pointing edge 14 of the decor part 5 is not upset by the top part 2.

By way of a gating funnel 15, the injection molding compound is injected at the provided flow rate into the cavity between the top and bottom part or between the top part and the lowered cut decor part 5. In this manner, the carrier 16 is produced which is molded to the decor part 5.

So that the injection molding compound will lastingly adhere to the decor part 5, a coupling layer is situated on the upward-pointing surface 17.

If the decor part is a fine-wood veneer, which in a known manner is covered on its backside with a blind veneer, a nonwoven coating which is saturated with phenol melamine resin or glue is placed on the blind veneer. Instead, only a glue layer may be applied. In any case, this intermediate layer, which is heated and/or activated by the temperature of the injection molding compound, ensures a durable and secure connection between the decor part 5 and the formed carrier 16.

If, instead of the above-mentioned veneer sandwich, a metal sheet, for example, made of aluminum, copper, high-grade steel or the like is used, a coupling material suitable for this purpose must be selected. To this extent, known gluing or adhesive materials can be used. In both cases, the bulk molding compound (BMC) technology is used in the injection molding. In contrast to known variants, the injection molding compound is a duroplastic material which is suitable for a full-surface backing. The low material processing contraction, the low heat expansion as well as a relatively high stiffness and stability of this fiber composite material of reactive premixed resin/fiberglass compound is particularly suitable for a combination with wood. In the case of wood and textile materials, a glue layer may also be eliminated. Toothing effects and an existing adhesion to the wood or textile fabric may be sufficient for a lasting connection. It should be added that the blind veneer layer or the nonwoven coating prevent the liquid plastic of the BMC compound from reaching the front side of the decor part.

Figure 2:
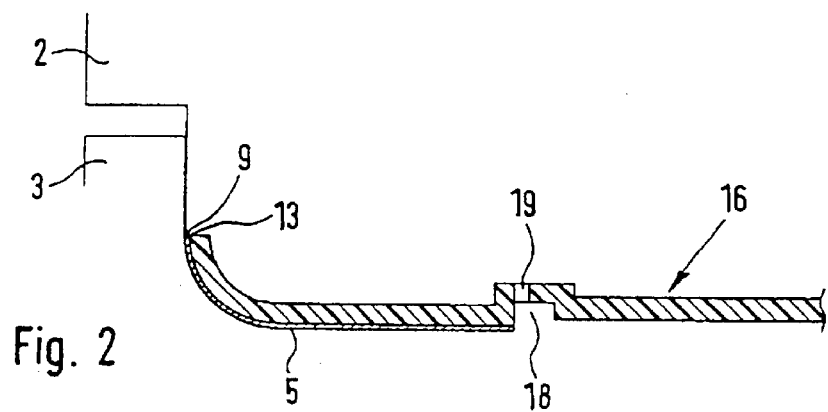
FIG. 2 is a representation corresponding to the right half of the FIG. 1 of a second embodiment of a covering and trim part.
Figure 3:
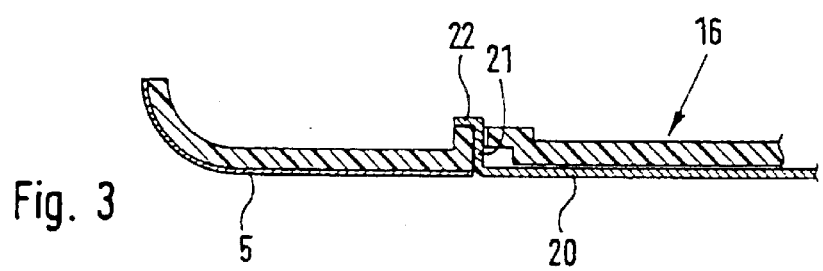
FIG. 3 is a view of a further development of the covering and trim part of FIG. 2.

The decor part 5 of the variant according to FIGS. 2 and 3 covers only a portion of the injection-molded-on carrier 16. The interior edge of this decor part is adjoined by a separation groove 18 of the injection-molded carrier 16. It is curved out in the direction of the free surface of the carrier. In addition, openings 19 are constructed perpendicularly to the plane of FIG. 2 on the wall in the area of the separation groove 18.

According to FIG. 3, a loose additional decor part 20 can now be placed on the not covered underside of the carrier 16. It engages in the separation groove 18 by means of an outer edge 21. In addition, tabs 22 (or similar fastening elements can be molded or, in a more general sense, mounted) on this edge, which tabs 22 are bent after the fitting-through according to FIG. 3 and, as a result, the additional decor part 20 is held on the carrier 16.

FIG. 3 also shows that the additional decor part 20 can extend to the decor part 5 and close off flush with it toward the outside. It may consist of the same material as the decor part 5 or of a different material than the decor part 5, and may therefore also have the same, a similar or a different color or color design. A gluing of the additional decor part 20 to the carrier 16 is not provided in the embodiment but is definitely conceivable.

The gating funnel 15 of the mold or the projection of the 13 carrier 16 fitted in it may be removed or, in the case of a corresponding design, may be used for mounting the part. In a manner which is not shown, function elements, such as fastening elements for the snapping-on or other holding of the covering or trim part, for example, on a motor vehicle, may be molded on or cast on from another material in a mold. Known art can be used for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for making a covering or trim part with a directly molded-on carrier, comprising:

placing a decorative part having a veneer wood layer or sheet metal part in an at least two-part injection mold;

closing the mold, thereby moving a cutting edge provided on a first part of the mold past an inside wall area of a second part of the mold and thereby cutting the decorative part to a precise shape by shearing off an outer edge of the decorative part while simultaneously pushing the decorative part in front of the cutting edge to an interior bottom surface of the second part of the mold, providing sealing between the cutting edge and a front edge of the decorative part formed by shearing off said outer edge, and defining at least part of a mold cavity between the first part of the mold and the decorative part;

injecting molding compound into the mold cavity after cutting the decorative part, which upon curing permanently bonds to the decorative part;

opening the mold; and removing the covering or trim part and molded-on carrier from the mold.

2. The method according to claim 1, wherein the injection molding takes place at a temperature of approximately 150° C.

3. The method according to claim 1, wherein the mold has a temperature of 150° C.

4. The method according to claim 1, further comprising placing a nonwoven coating saturated with phenol melamine resin and a layer of glue on the veneer wood layer.

5. The method according to claim 1, further comprising placing a layer of glue on the veneer wood layer.

6. The method according to claim 1, further comprising placing a layer of blind veneer on the veneer wood layer.

7. The method according to claim 1, further comprising:

applying a coupling layer to the backside of the sheet metal part; and heating or activating the coupling layer with the injection molding compound.

8. The method according to claim 7, wherein the coupling layer is a reactive hot-melt-type adhesive or a dry glue film.

9. The method according to claim 8, further comprising embedding fastening elements for the covering or trim part in the injection molding compound.

* * * * *